Figure 1:
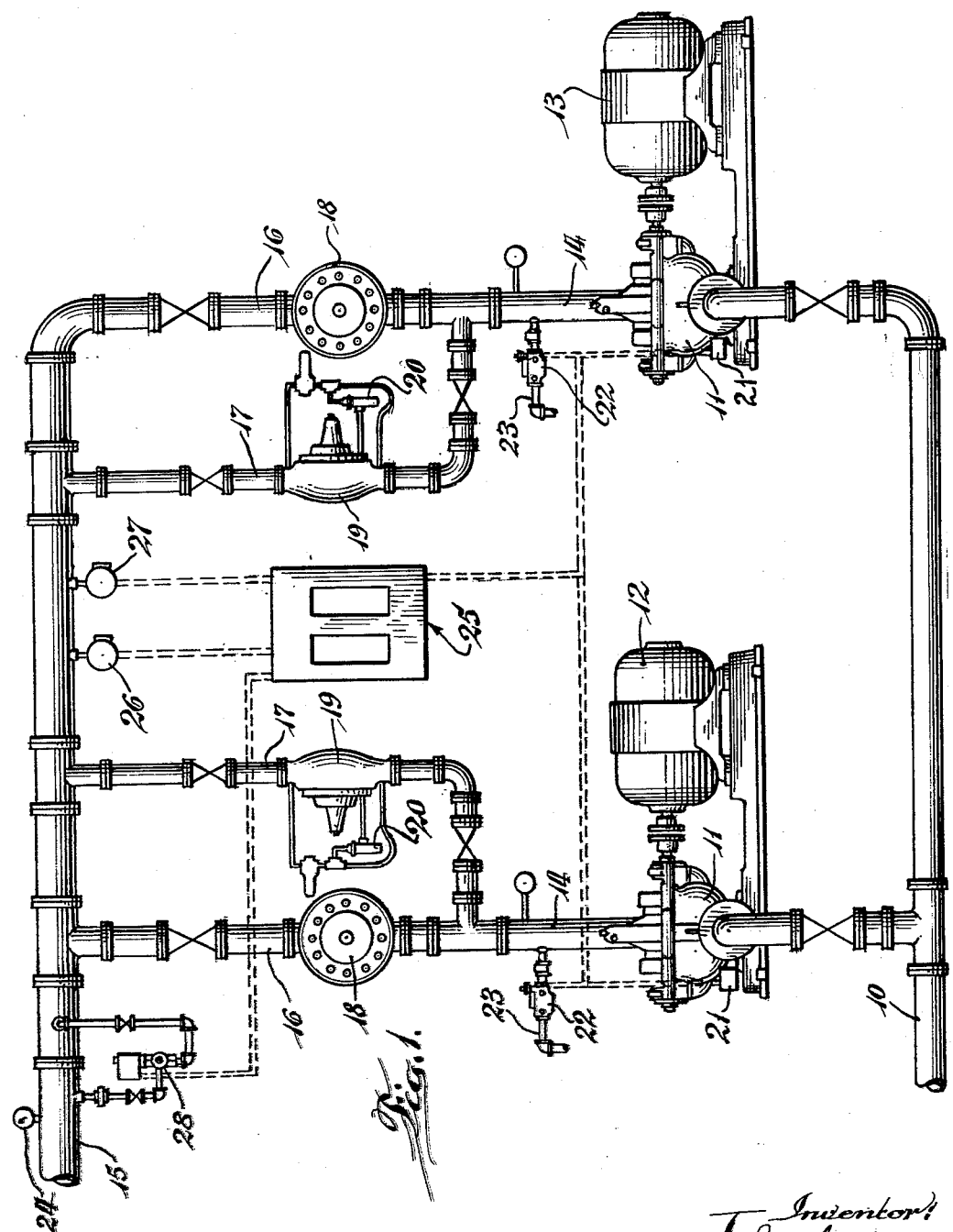

June 2, 1964 J. GRAY 3,135,282
PRESSURE CONTROL FOR WATER SYSTEMS
Filed Oct. 20, 1961 2 Sheets-Sheet 2

Inventor:
John Gray
By Schneider, Dressler, Goldsmith & Clement
Attorneys

United States Patent Office 3,135,282
Patented June 2, 1964

3,135,282
PRESSURE CONTROL FOR WATER SYSTEMS
John Gray, Oak Park, Ill., assignor to FMC Corporation, a corporation of Delaware
Filed Oct. 20, 1961, Ser. No. 146,593
10 Claims. (Cl. 137—114)

This invention relates to a pressure control for water systems, and is particularly concerned with apparatus for delivering water or other liquid at a constant pressure when the system demand and the supply source are both variable.

Although the pressure control of the present invention is intended primarily for use in controlling the discharge pressure in water supply systems in buildings, it is not limited to such use, and may be used with other liquids. For example, it may be used in a machine shop having a multiplicity of cutting machines to supply cutting oil at a constant pressure to all of the cutting machines. The pressure control system may also be used on an assembly line for testing a multiplicity of valves, faucets or other liquid handling devices designed to operate at a specific pressure.

The pneumatic water supply systems currently used are expennsive to install and maintain. Another objectionable feature of the pneumatic systems is that they require considerable tank space. This is a particular disadvantage in high rise buildings where space is very valuable.

The pressure control system of the present invention is comparatively inexpensive to install, and the maintenance cost is considerably less than pneumatic systems of comparable capacity. In accordance with this invention, the pressure control system does not use any pressure tanks, and thus completely eliminates all tank space requirements, thereby effecting a considerable saving in space. A water supply system constructed in accordance with the present invention will provide constant uniform system pressure regardless of flow requirements or suction variation above the minimum for which the particular system is designed.

In accordance with the present invention the pressure control system includes two pumps each of which has a main pressure regulating valve and an auxiliary pressure regulating valve. Preferably each pump has a capacity sufficient to carry the peak load of the system, however each pump may be sized at any capacity over 50% peak load with both pumps operating in parallel to meet peak load conditions. In such case both main and both auxiliary pressure regulating valves share the flow and maintain the system pressure at its preset constant pressure. It is preferred to operate one pump continuously, supplying the flow demands of the system at a constant pressure governed by one set of the pressure regulating valves. The flow requirements may vary from zero to maximum, and the pump discharge pressure will likewise vary according to suction pressure and flow. The excessive pressure above the desired system pressure builds up on the pump side of the pressure regulating valve. The pump will normally operate at its duty point on maximum flow and minimum suction pressure.

If a pump is operating it will normally continue to operate until it is shut off. When the flow demand exceeds the duty point of the pump in operation, the pressure in the system drops. A pressure controlled switch is set to start the second pump when the system pressure drops to a predetermined lower system pressure. When both pumps are operating, the desired pressure is again attained and is maintained by the pressure regulating valves. When the flow demand drops, a flow control switch stops the operation of the second pump, and the flow demand is taken care of by the first pump until the demand again exceeds the capacity of the first pump. The fact that the second pump is started by a drop in the pressure and stopped by a drop in the flow demand provides another advantage over other dual pump systems in that time delays in the starting circuit are eliminated. Time delays are normally required in other dual pump systems to prevent rapid start-stop cycles caused by pressure surges in the line.

If one of the pumps operates for a long period of time at zero flow, the water continuously circulates within the pump casing, and is heated by friction. If the heating continues long enough it might distort the metal and damage the pump. The pump discharge line is provided with a solenoid controlled purge valve and a heat detecting device is located within the pump casing. If the temperature approaches the danger point, the heat detecting device automatically actuates a switch that opens the purge valve and purges the pump casing of the hot water.

When a pump has been operated continuously for a week or so, it is preferably shut off while the other pump is operated for a similar period. This alternate change from one pump to the other prevents excessive wear of either pump and also insures that the standby pump is in operable condition whenever an increase in the flow demand causes the pressure to drop and cut in the second pump.

The purpose of the auxiliary pressure regulating valve is to prevent excessive wear of the seats on the main pressure regulating valve. The main valve is set to discharge water at the desired system pressure, while the auxiliary valve is set to discharge water at a slightly higher pressure. For example, if the desired system pressure is 80 pounds per square inch, the main valve will discharge water at that exact pressure, and the auxiliary valve will discharge water at 81 pounds per square inch. This pressure differential does not affect the system pressure because the amount of water discharged by the main valve is considerably greater than that discharged by the auxiliary valve when the system is in normal operation. Thus, if the system discharges 300 gallons per minute, the main valve will discharge about 225 gallons per minute and the auxiliary valve will discharge about 75 gallons per minute. The pressure on the pump side of the valves is about 2 pounds per square inch higher than the valve discharge pressure in order to enable the valves to maintain a constant discharge pressure.

The valves are combination pressure regulating and non-slam check valves, and the auxiliary valve is connected in parallel to the main valve primarily to handle low flow while the main valve remains closed. The auxiliary valve protects the main valve from excessive wear, and also makes it possible to use a smaller main valve because it takes care of a certain proportion of the flow demand when the main valve is open. The difference in the valve discharge pressure causes the auxiliary valve to open before the main valve when the flow demand increases from a zero flow. The main valve remains closed until the flow demand exceeds the capacity of the auxiliary valve. At that time the valve discharge pressure drops, and the main valve opens.

The valves connected to the second pump operate in the same manner. When the flow demand exceeds the capacity of the first pump, the second pump is started automatically, and the second auxiliary valve is opened. As long as the flow demand of the system does not exceed the capacity of the first pump by more than the capacity of the second auxiliary valve, the second main valve will remain closed, and therefore will not be subjected to wear.

When both valves of the first pump are open and the flow demand drops to a predetermined extent, for example, to a flow of about 50 gallons per minute when the flow capacity of the pump is about 300 gallons per minute, the valve discharge pressure differential causes the main valve to close while the auxiliary valve remains open to supply the limited flow demand. The opening rate of the auxiliary valve is controlled by a needle valve, and the auxiliary valve will not close completely as long as the flow demand remains above zero. If the pressure on the pump side of the valve drops below the system pressure, as would happen, for example, in the case of a power failure, both valves will automatically close and thereby prevent draining the system.

Figure 2:
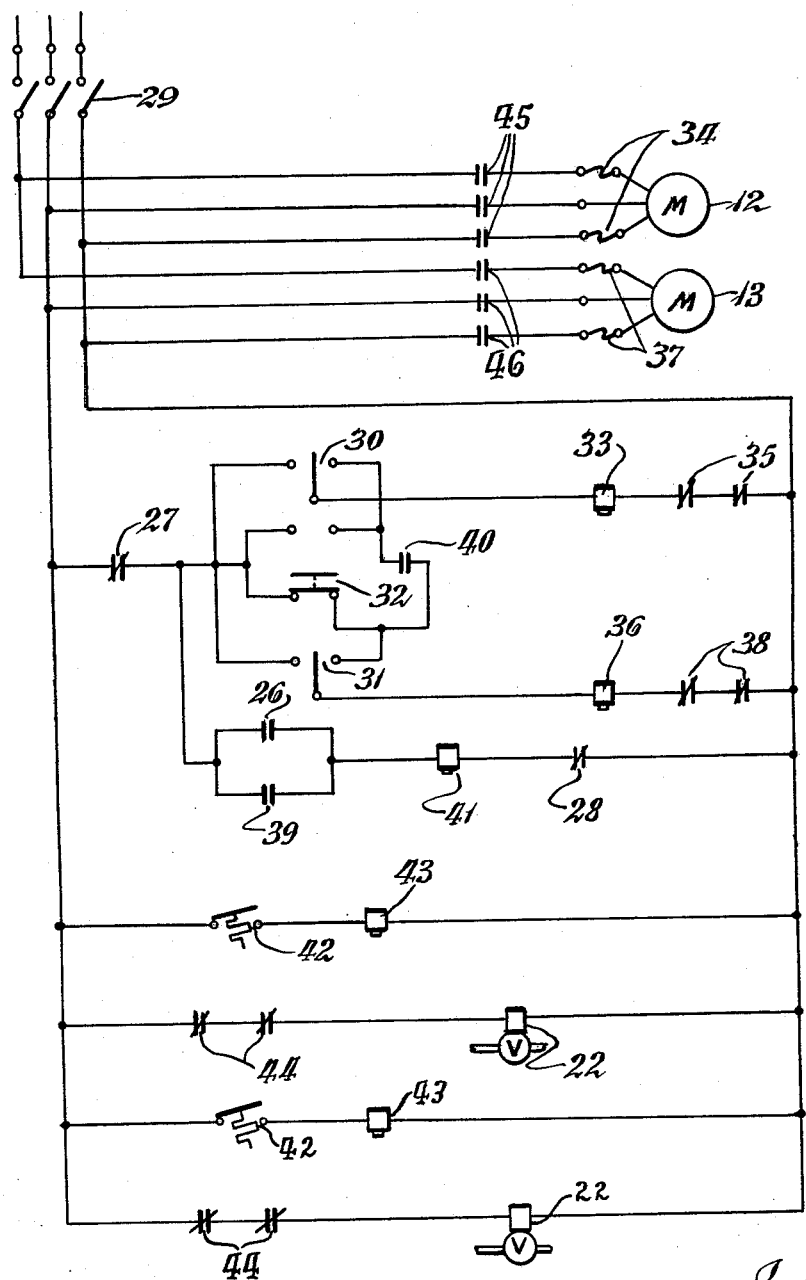

The structure by means of which the above and other advantages of the invention are attained will be described in detail in the following specification, taken in conjunction with the accompanying drawings showing a preferred illustrative embodiment of the invention, in which:

FIGURE 1 is a front elevational view of pressure control apparatus embodying the invention; and FIGURE 2 is a diagrammatic view of the electrical wiring for operating the apparatus.

Referring to the drawings, an inlet conduit 10 connects a source of water under pressure, as from a city main, to a pair of pumps 11, each operated by a constant speed electric motor 12 or 13. The line 14 leading from each pump is connected to a discharge pipe 15 by a pair of conduits 16 and 17. The conduit 16 has a main pressure regulating valve 18, and the line 17 has an auxiliary pressure regulating valve 19 connected in parallel to said main valve. The valves are shown in vertical position, but it will be understood that they may be mounted horizontally, if desired.

Valve 18 is normally larger than valve 19 and is set to have a discharge pressure slightly less than the discharge pressure of the auxiliary valve. This causes the main valve to close when the flow demand drops below a predetermined minimum, while the auxiliary valve remains open to supply the limited flow demand. The auxiliary valve 19 has a needle valve 20 that controls the flow of water from the valve bonnet and dampens the tendency of the valve to pulsate on low flows. If the pressure on the pump side of valves 18 and 19 drops below the system pressure, due for example to loss of inlet water or stopping of the pumps due to power failure, both valves will close because of their check valve features, thereby preventing the draining of the system through the pumps.

If valves 18 and 19 are closed, as when the flow demand is at zero, the water will continue to circulate through the pump casing and will be heated by friction. If the pump operates for a long time at zero flow, the water may be heated enough to distort the metal and possibly damage the pump. A heat detecting device 21 is placed within the pump casing. If the water gets too hot, the heat detecting device 21 actuates a switch to open a solenoid controlled purge valve 22 that purges the pump casing of the hot water by bleeding it through conduit 23.

When the flow demand increases beyond the capacity of the auxiliary valve 19, the valve discharge pressure drops to the system pressure for which the valve 18 is set. A pressure gauge 24 is mounted in the discharge line 15 to indicate the system pressure. As the flow demand increases beyond the capacity of the valve 19, the valve discharge pressure drops, thus causing the valve 18 to open. The valve 18 is pilot controlled, and is set to open and maintain the desired system pressure. For example, if the valve 19 has a flow capacity of 75 gallons per minute at one pound per square inch above the desired system pressure, it will maintain the pressure at which it is set as long as the flow demand does not exceed 75 gallons per minute. When the flow demand exceeds 75 gallons per minute, the drop in the valve discharge pressure causes the valve 18 to open, and both valves 18 and 19 of pump 11 share the flow and maintain the desired system pressure.

When both valves are open, the major portion of the water flows through valve 18 because of its larger opening. In the example given, if the flow demand is 300 gallons per minute, valve 19 will discharge about 75 gallons per minute and valve 18 will discharge about 225 gallons per minute. The valve 18 is shut off automatically when the flow demand drops to a predetermined point that is considerably below the flow capacity of the valve 19. In the example given, when the flow capacity of valve 19 is 75 gallons per minute the valve 18 is automatically closed when the flow demand drops to approximately 50 gallons per minute. The valve 18 is kept open until after the flow demand drops a considerable amount below the flow capacity of valve 19 to avoid excessive wear on the valve seat of valve 18. If valve 18 is closed immediately after the flow demand drops below the flow capacity of valve 19, a slight increase in the flow demand will open valve 18 again. A fluctuation of a few gallons per minute in a range close to the flow capacity of valve 18 would cause valve 18 to open and close frequently, thereby causing excessive wear on its seat. With the shut-off point for valve 18 considerably below the capacity of valve 19, fluctuations in flow demand immediately after valve 18 is closed, do not affect valve 18 because it will not re-open until the flow demand exceeds the capacity of valve 19. The valve 18 is opened by a drop in pressure in the discharge line, and the pressure in the discharge line cannot drop until the flow demand exceeds the flow provided by the valve 19.

The pump and valve system hereinabove described is connected to a duplicate system through a control panel 25. The motor in the second system is designated by the reference numeral 13, to facilitate identification of the first and second systems, but otherwise all duplicate structure is indicated by the same reference numerals. It will be understood that the reference to "first" and "second" systems is purely arbitrary, as either system may be used to supply the flow demand in the first instance.

When the flow demand increases beyond the duty point of the lead pump the system pressure will drop. When the system pressure drops to a predetermined low, a pressure controlled switch 26 actuates the second pump 11. With both units supplying the system, each pump supplies one half the flow demand, and the pressure regulating valves maintain the desired system pressure. A second pressure operated switch 27 is actuated by an extremely low pressure to shut off both pumps. When flow demand drops a predetermined amount below the duty point of pump 11 of the first system, a flow control switch 28 stops the operation of motor 13. The electrical circuitry by means of which the various parts are actuated is disclosed in FIG. 2.

In the diagram of FIG. 2, the constant speed motors 12, 13 are connected to a power source by main switches 29. The circuit includes selector switches 30 and 31 for motors 12 and 13, respectively. The selector switches are independent of each other and either switch may be set for hand or automatic operation. Ordinarily both selector switches are set on automatic and stay there. The selector switches also have an off position. A pump transfer switch 32 is provided so that either motor 12 or 13 may run continuously, with the other as a standby in case the flow demand exceeds the capacity of one pump. As shown in FIG. 2, switch 32 is thrown in one position for continuous operation of motor 13, and motor 12 is the standby motor.

The circuit for motor 12 includes an automatic magnetic across-the-line starter with overload protection. Included in the starter are solenoid 33, heaters 34, normally closed contacts 35 and normally open contacts 45. The circuit for motor 13 is similarly provided with a starter including solenoid 36, heaters 37, normally closed contacts 38 and normally open contacts 46, all of which operate in the same manner as their counterparts in the circuit for motor 12.

In FIG. 2 the pump transfer switch 32 is shown in position for operation of motor 13 as the first or constantly operating motor, and the motor 12 as the second or standby motor. For automatic operation of the system, pressure controlled switch 27 is closed, selector switches 30 and 31 are each in the automatic position, and solenoid 36 is energized, closing normally open contacts 46 to start motor 13. As long as pump 11 connected to motor 13 supplies the flow demand of the system at the required discharge pressure, pressure controlled switch 26 remains open and solenoid 41 remains de-energized, thus keeping contacts 39 and 40 open.

If the flow demand exceeds the ability of the operating pump 11 to supply the demand and maintain the desired system pressure, the pressure drops. As soon as the pressure reaches a first predetermined low, pressure controlled switch 26 closes, energizing solenoid 41 which in turn closes normally open contacts 39 and 40. When contact 40 is closed it energizes solenoid 33 which in turn closes contacts 45 to start motor 12, so that both pumps are operated to supply the flow demand. Solenoid 41 remains energized until either pressure controlled switch 27 or flow controlled switch 28 is opened.

If the flow demand decreases to a predetermined low, flow control switch 28 opens and de-energizes solenoid 41 which in turn opens contacts 39 and 40. When contact 40 is opened it de-energizes solenoid 33, thereby opening contact 45 to stop motor 12 while motor 13 remains in operation.

If the discharge pressure drops below the first predetermined low pressure to a second predetermined low pressure, indicating trouble, pressure controlled switch 27 opens and de-energizes solenoid 33, 36 and 41, which in turn open contacts 39, 40, 45 and 46 to stop both motors 12 and 13.

In order to put the motor 13 into operation again, after it has been stopped by opening of pressure controlled switch 27, a manual reset (not shown) incorporated in pressure controlled switch 27 is manually operated to lock switch 27 in its normally closed position. The closing of switch 27 re-energizes solenoid 36 to start motor 13. The manual reset holds the switch 27 closed until the pump operated by motor 13 builds the pressure up to a point above the second predetermined low pressure. When the pressure reaches above the second predetermined low pressure, the switch 27 becomes independent of the manual reset, and will re-open if the pressure again drops to the second predetermined low.

The control circuit for each pump also contains a heat detecting device 21, a normally closed temperature actuated switch 42, a solenoid 43, a pair of normally closed contacts 44 and a solenoid operated valve 22. If the flow demand is zero, or substantially zero, the water will circulate within the pump casing and become hot. At a pre-determined temperature, the temperature actuated switch 42 opens, de-energizing solenoid 43, thereby closing normally closed contact 44, which in turn, energizes the solenoid of solenoid operated valve 22, opening said valve to permit the hot water to be discharged through conduits 23, and allowing cold water to enter the pump.

The inflowing cold water causes a temperature drop that closes temperature actuated switch 42 that in turn energizes solenoid 43, thereby opening normally closed contacts 44 and de-energizing the solenoid of solenoid operated valve 22, causing it to close. The time required for the closing of solenoid operated valve 22 is controlled by an adjustable needle valve (not shown) that permits sufficient cold water to enter the pump to completely purge it of hot water.

Although I have described a preferred embodiment of the invention in considerable detail, it will be understood that the description thereof is intended to be illustrative rather than restrictive, as many details of construction may be modified or changed without departing from the spirit or scope of the invention. Accordingly, I do not desire to be restricted to the exact structure disclosed.

I claim:

1. A liquid flow system adapted to supply liquid at a constant uniform discharge pressure comprising a plurality of pumps connected in parallel to a source of liquid under pressure and to a common discharge pipe, a pressure regulating valve between each of said pumps and said discharge pipe, means for sequentially actuating said pumps in response to predetermined pressure drops in said discharge pipe and means for shutting off said pumps sequentially in reverse order in response to predetermined reduction in the flow demand in said system, said first mentioned means constituting the sole means for actuating said pumps, said second mentioned means constituting the sole means for shutting off said pumps under normal operating conditions.

2. A liquid flow system adapted to supply liquid at a constant uniform discharge pressure comprising a plurality of pumps connected in parallel to a source of liquid under pressure and to a common discharge pipe, a pressure regulating valve between each of said pumps and said discharge pipe, means for sequentially actuating said pumps in response to predetermined pressure drops in said discharge pipe, means for shutting off said pumps sequentially in reverse order in response to predetermined reduction in the flow demand in said system, said first mentioned means constituting the sole means for actuating said pumps, said second mentioned means constituting the sole means for shutting off said pumps under normal operating conditions and means operable in response to a predetermined temperature rise in the liquid of each of said pumps to automatically empty the hot liquid from the related pump.

3. A liquid flow system adapted to supply liquid at a constant uniform discharge pressure comprising a first pump and a second pump connected in parallel to a source of liquid under pressure and to a common discharge pipe, a pair of pressure regulating valves connected in parallel between each of said pumps and said common discharge pipe, means for actuating said first pump and opening one of said valves related thereto in response to a pressure drop induced by a flow demand, means for opening said second valve related to said first pump in response to a pressure drop induced by an increase in the flow demand in excess of the capacity of said first mentioned valve, means for actuating said second pump in response to a predetermined pressure drop in said discharge pipe when both valves related to said first pump are open, and means for shutting off said second pump in response to a predetermined decrease in the flow demand in said system, said last mentioned means constituting the sole means for shutting off said second pump under normal operating conditions.

4. A liquid flow system comprising a pair of pumps, an inlet conduit connected to a source of liquid under pressure and to said pair of pumps, a separate motor connected to each of said pumps, a discharge conduit leading from each of said pumps to a common discharge pipe, an electrical circuit energizing one of said motors to operate its related pump continuously, a pressure controlled switch in said circuit operable automatically to energize said second motor in response to a predetermined pressure drop in said discharge pipe, said pressure controlled switch constituting the sole means of energizing said second motor, and a flow controlled switch in said circuit operable automatically to de-energize said second motor in response to a predetermined reduction in the flow demand in said system, said flow controlled switch constituting the sole means of de-energizing said second motor under normal operating conditions.

5. A liquid flow system comprising a pair of pumps, an inlet conduit connected to a source of liquid under pressure and to said pair of pumps, a separate motor connected to each of said pumps, a discharge conduit leading from each of said pumps to a common discharge pipe, an electrical circuit energizing one of said motors to operate its related pump continuously, a pressure controlled switch in said circuit operable automatically to energize said second motor in response to a predetermined pressure drop in said discharge pipe, said pressure controlled switch constituting the sole means for energizing said second motor, and a second pressure controlled switch in said circuit operable automatically to de-energize both of said motors in response to an excessive pressure drop in said discharge pipe.

6. A liquid flow system comprising a pair of pumps, an inlet conduit connected to a source of liquid under pressure and to said pair of pumps, a separate motor connected to each of said pumps, a discharge conduit leading from each of said pumps to a common discharge pipe, an electrical circuit energizing one of said motors to operate its related pump continuously, a pressure controlled switch in said circuit operable automatically to energize said second motor in response to a predetermined pressure drop in said discharge pipe, said pressure controlled switch constituting the sole means for energizing said second motor, a flow controlled switch in said circuit operable automatically to de-energize said second motor in response to a predetermined reduction in the flow demand in said system, said flow controlled switch constituting the sole means for de-energizing said second motor under normal operating conditions, and means operable in response to a predetermined temperature rise in the liquid in each of said pumps to automatically empty the hot liquid from the related pump.

7. A liquid flow system comprising a pair of pumps, an inlet conduit connected to a source of liquid under pressure and to said pair of pumps, a separate motor connected to each of said pumps, a discharge conduit leading from each of said pumps to a common discharge pipe, an electrical circuit energizing one of said motors to operate its related pump continuously, a pressure controlled switch in said circuit operable automatically to energize said second motor in response to a predetermined pressure drop in said discharge pipe, said pressure controlled switch constituting the sole means for energizing said second motor, a flow controlled switch in said circuit operable automatically to de-energize said second motor in response to a predetermined reduction in the flow demand in said system, said flow controlled switch constituting the sole means for de-energizing said second motor under normal operating conditions, a solenoid valve operatively connected to each of said pumps, and a temperature controlled switch operable at a predetermined temperature to open said solenoid valve to purge the related pump of its hot liquid.

8. A liquid flow system comprising a pair of pumps, an inlet conduit connected to a source of liquid under pressure and to said pair of pumps, a separate motor connected to each of said pumps, a pair of discharge conduits leading from each of said pumps to a common discharge pipe, a pressure regulating valve in each of said discharge conduits, the valve in one of said discharge conduits being arranged to open sequentially before either valve in the other pair of discharge conduits is opened, an electrical circuit energizing one of said motors to operate its related pump continuously, a pressure controlled switch in said circuit operable automatically to energize said second motor in response to a predetermined pressure drop in the discharge pipe when both valves related to said first pump are open, said pressure controlled switch constituting the sole means for energizing said second motor, and a flow controlled switch in said circuit operable automatically to de-energize said second motor in response to a predetermined reduction in the flow demand in said system, said flow controlled switch constituting the sole means for de-energizing said second motor under normal operating conditions.

9. A liquid flow system adapted to supply liquid at a constant uniform discharge pressure regardless of variances in the pressure of liquid supplied to said system and of the flow demand for liquid from said system, said liquid flow system comprising a plurality of pumps connected in parallel to a source of liquid under pressure and to a common discharge pipe, a pressure regulating valve between each of said pumps and said discharge pipe, a separate constant speed motor operatively connected to each of said pumps, means for sequentially actuating said pumps only in response to pressure drops of predetermined magnitude in said discharge pipe, and means for shutting off said pumps sequentially in reverse order only in response to reduction of predetermined magnitude in the flow demand.

10. A liquid flow system adapted to supply liquid at a constant uniform discharge pressure regardless of variances in the pressure of liquid supplied to said system and of the flow demand for liquid from said system, said liquid flow system comprising a pair of pumps, an inlet conduit connected to a source of liquid under pressure and to said pair of pumps, a separate constant speed motor operatively connected to each of said pumps, a discharge conduit leading from each of said pumps to a common discharge pipe, an electrical circuit energizing one of said motors to operate its pump continuously, a pressure controlled switch in said circuit constituting the sole means for energizing said second motor, said pressure controlled switch being operable automatically to energize said second motor in response to a pressure drop of predetermined magnitude in said discharge pipe, and a flow controlled switch in said circuit, said flow controlled switch being operable to shut off said second motor in response to a reduction of predetermined magnitude in the flow demand of said system.

References Cited in the file of this patent

UNITED STATES PATENTS

| | | |
|---|---|---|
| 1,235,558 | De Laval | Aug. 7, 1917 |
| 1,305,997 | Fortney | June 10, 1919 |
| 1,343,735 | MacBryde | June 15, 1920 |
| 1,905,284 | Heitger | Apr. 25, 1933 |
| 2,440,981 | Smith | May 4, 1948 |
| 2,486,256 | Buck | Oct. 25, 1949 |
| 2,526,646 | Ericson | Oct. 24, 1950 |
| 2,672,820 | Hillier | Mar. 23, 1954 |
| 2,741,986 | Smith | Apr. 17, 1956 |
| 2,888,875 | Buck | June 2, 1959 |
| 2,905,191 | Vander Kaay | Sept. 22, 1959 |
| 3,060,858 | Shoosmith | Oct. 30, 1962 |

FOREIGN PATENTS

| | | |
|---|---|---|
| 430,701 | France | Aug. 19, 1911 |